April 19, 1966 B. W. LEE 3,247,497

ANALOG DATA SYSTEM

Filed April 23, 1962 3 Sheets-Sheet 1

INVENTOR.
BOCK W. LEE

BY Lothrop & West

ATTORNEYS

April 19, 1966 B. W. LEE 3,247,497

ANALOG DATA SYSTEM

Filed April 23, 1962 3 Sheets-Sheet 2

INVENTOR.
BOCK W. LEE
BY Lothrop & West
ATTORNEYS

April 19, 1966 B. W. LEE 3,247,497

ANALOG DATA SYSTEM

Filed April 23, 1962 3 Sheets-Sheet 3

INVENTOR.
BOCK W. LEE
BY Lothrop & West
ATTORNEYS

United States Patent Office 3,247,497

Patented Apr. 19, 1966

3,247,497
ANALOG DATA SYSTEM

Bock W. Lee, Berkeley, Calif., assignor to Noller Control Systems, Inc.

Filed Apr. 23, 1962, Ser. No. 189,485
6 Claims. (Cl. 340—206)

My invention relates to means for transmitting information or data by means of an analog to a distant point and receiving the analog at the distant point and converting it to reproduce the original. The data transmission is preferably accomplished by a carrier system functioning in accordance with pulse technique and also with a phase shift arrangement as shown in my copending application entitled "Phase Shift Signalling System" filed March 14, 1961, with Serial No. 95,741 and assigned to the asignee of the present application.

There are many instances, particularly in industry, wherein the appearance of data at a sending point; for example, the reading of a meter, can advantageously be transmitted over any reasonable distance to a receiving point at which the data or a close reproduction thereof is made either by display or recording. There is a considerable demand for a system utilizing carrier transmission for reproducing at the receiving point the data available at the sending point, the reproduction being accurate within a small amount.

There are also many instances in which a system of this sort operating unattended and automatically for long periods of time can advantageously be utilized.

It is therefore an object of my invention to provide a complete system, both transmitter and receiver, for sensing with reasonable accuracy at the sending point a datum which varies within known limits and for then transmitting by carrier system an analog of the datum. The system at the receiver translate the analog and reproduces within desried limits of accuracy the datum originally sensed.

Another object of the invention is to provide an analog data system in which the sensing of the data and the energization of the transmitting medium is accomplished by means of pulse technique.

A still further object of the invention is to provide such a system in which the receiving mechanism resembles the sending mechanism and operates by a pulse technique to afford a reproduction within given limits of the original datum.

Another object of the invention is to provide an analog data system which is straightforward in technique and relatively simple and economical to manufacture and maintain.

A still further object of the invention is to provide an analog system utilizing solid state components and being adaptable to widely variant conditions of installation and use.

Other objects together with the foregoing are attained in the embodiment of the invention described in the accompanying description and illustrated in the accompanying drawings in which.

Figure 1:
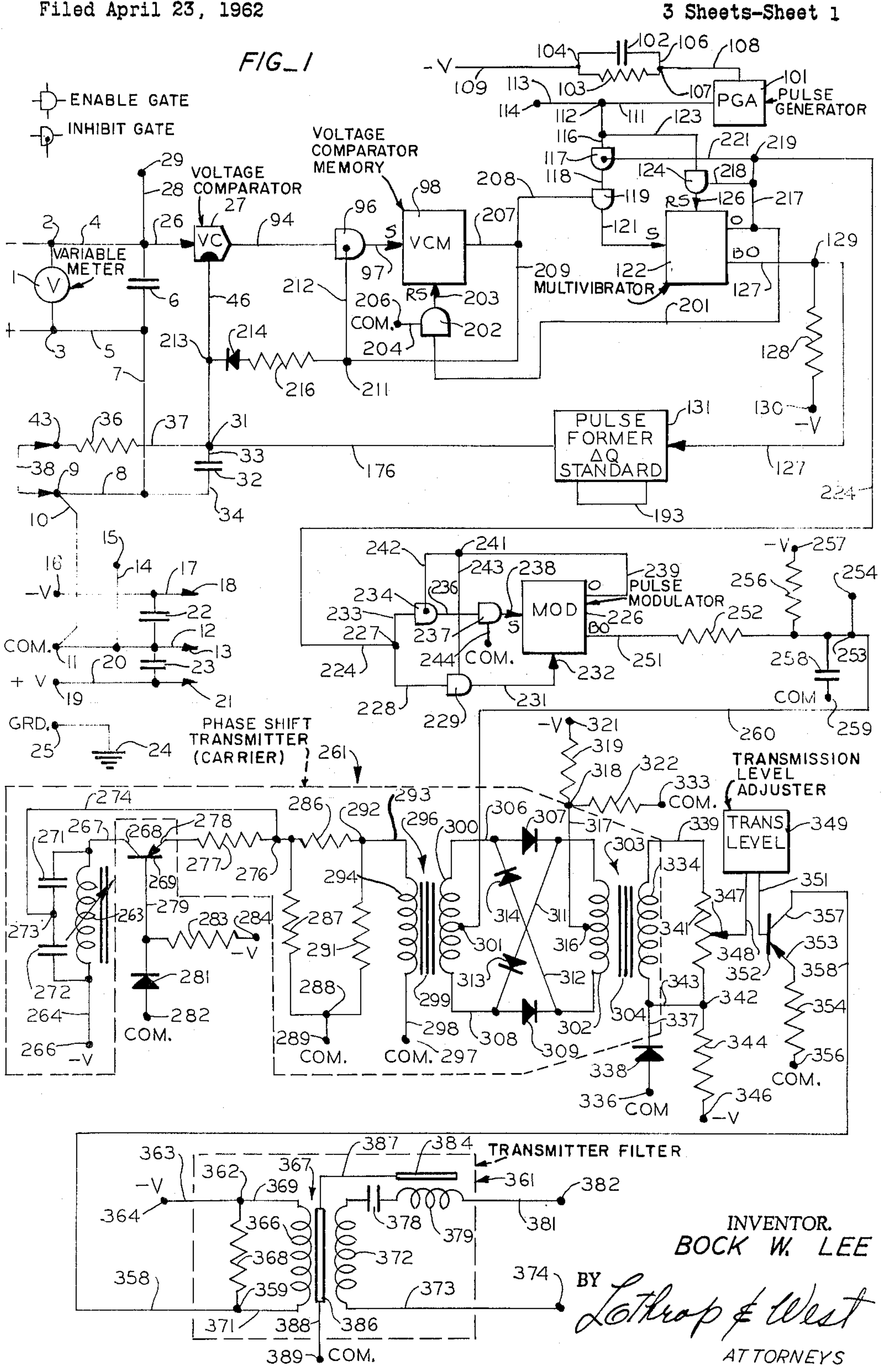
FIGURE 1 is a schematic diagram showing the data gathering and transmitting unit.

While the analog data system pursuant to the invention can be incorporated in a number of different ways, it has successfully been commercially incorporated and utilized substantially as shown herein. In this instance it is desired to transmit data from a source such as a variable meter 1; for example, a meter indicating voltage ranging between 0 volts and 5 volts. This source of data measures the instantaneous voltage appearing across a negative terminal 2 and a positive terminal 3 in conducting lines 4 and 5. This is a direct current voltage and is also compressed upon a capacitor 6 connected across the lines 4 and 5 to short-circuit stray alternating voltages. The main conductor 5, for example, is connected by a jumper 7 and a lead 8 to a terminal point 9 in turn connected by a lead 10 to a common terminal 11 from which a conductor 12 extends to other common connections represented by an arrow 13. Thus the positive terminal 3 is connected to common. Associated with the conductor 12 is a lead 14 to a test point 15. Also, for convenience a terminal 16 at negative voltage has a conductor 17 going to other negative voltage points, represented by an arrow 18. A terminal 19 at positive voltage has a conductor 20 going to other positive voltage points represented by an arrow 21. Capacitors 22 and 23 bridge the conductors 17 and 12 and 12 and 20, respectively. A chassis ground 24 is connected to a ground terminal 25.

The other main conductor 4 extends through a lead 26 to a voltage comparator 27. A conductor 28 extends to a test point 29. In accordance with the invention, the voltage comparator 27 is utilized periodically and at selected intervals to compare the voltage (relative to common) appearing in the lead conductor 26 with another, reference voltage (relative to common) which continually augments and declines during successive periods of operation.

The reference voltage is produced at a standard point 31 connected to a standard capacitor 32 through a lead 33. The opposite side of the capacitor 32 is connected by a lead 34 to the lead 8 connected to common so that the capacitor 32 operates between the standard point 31 and common. Also connected between the standard point 31 and common in parallel with the capacitor 32 is a precision resistor 36. A lead 37 places this resistor in circuit with the standard point 31. A strap 38 is connected to a terminal 43 on the resistor 36 and to the terminal point 9. As will be described, the standard point 31 repeatedly receives measured quantities of electricity so that the charge of the capacitor 32 is repeatedly augmented with the charges accumulating and the capacitor voltage increasing except as the capacitor voltage is decreased by a continual discharge through the precision resistor 36.

The momentary voltage value existing at the standard point 31 is transferred by a conductor 46 to the voltage comparator 27. Within the voltage comparator the voltage at the origin of the data (the meter 1) as it appears in the lead 26 is compared with the voltage at the standard point 31 as it appears in the conductor 46. The function of the voltage comparator is to emit a pulse whenever the voltage from the data source in the lead 26 exceeds the voltage in the conductor 46 as established by the standard point 31. The voltage comparator refrains from issuing any pulses when the voltage in the conductor 46 from the standard point 31 is greater than the voltage from the data source in the lead 26.

Figures 3, 4, 5:
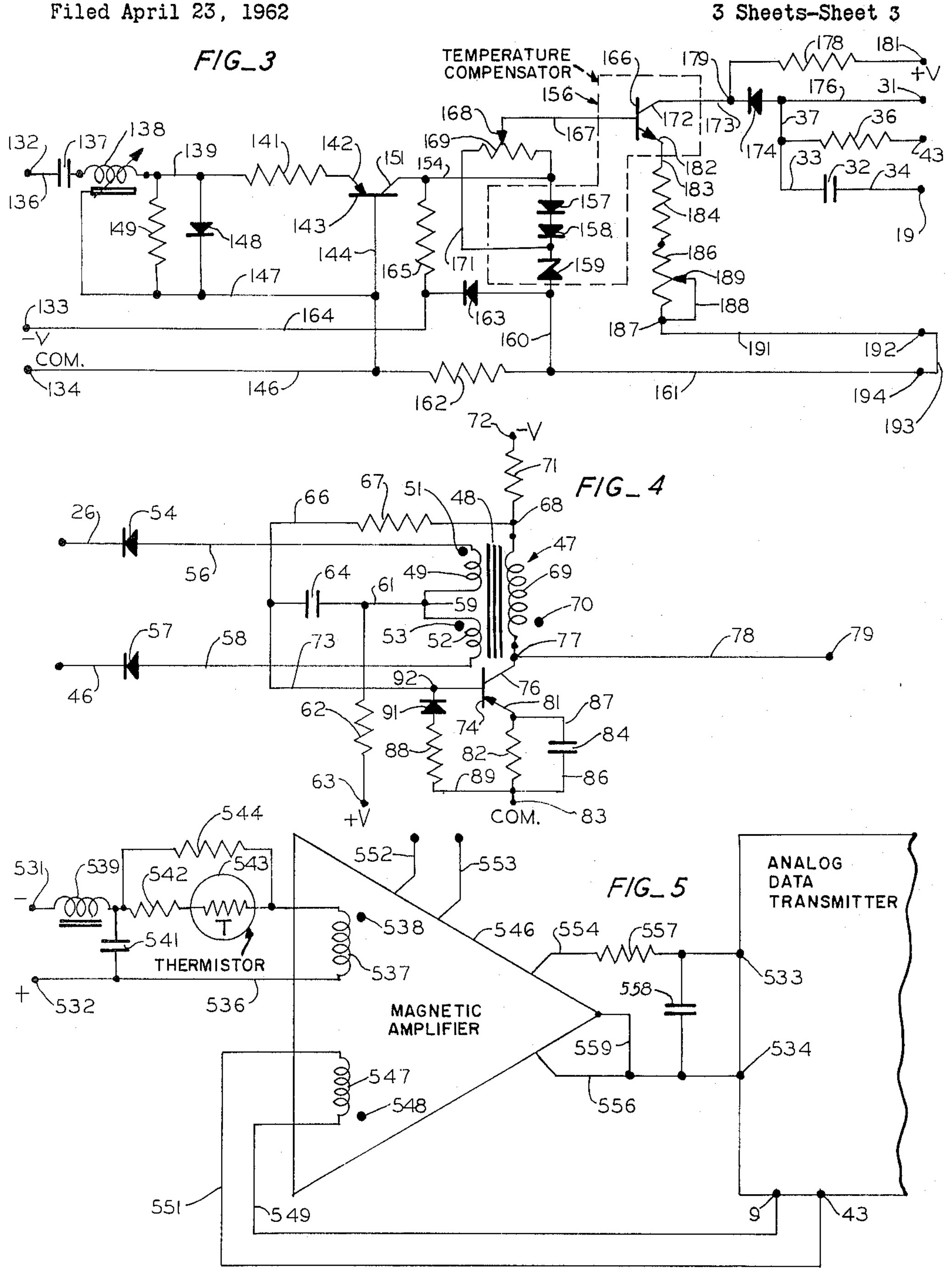
FIGURE 3 is a detailed diagram showing the construction and circuitry of the pulse forming unit shown diagrammatically in FIGURE 1.
FIGURE 4 is a detailed circuit diagram indicating the components incorporated with the voltage comparator shown diagrammatically in FIGURE 1.
FIGURE 5 is a diagram showing the circuitry and components of a magnetic amplifier utilized in some conditions at the data source.

In a particular construction, the voltage comparator 27 as shown in FIGURE 4 includes a pulse transformer 47. In the pulse transformer is a core 48 and a polarized primary winding 49, the polarity of which is indicated by a dot 51. The transformer also includes another primary winding 52, the polarity of which is indicated by a dot 53. The lead 26 within the voltage comparator 27 is connected through a diode 54 to a conductor 56 extending to one end of the primary coil 49, whereas the conductor 46 similarly extends through a diode 57 and a conductor 58 to one end of the primary coil 52.

The coils 49 and 52 are joined at a terminal 59 so that as to the terminal 59 their polarities are reversed. From the terminal 59 a lead 61 extends through a resistor 62 to a terminal 63 connected to a plus voltage source.

A capacitor 64 joins the lead 61 to a lead 66 extending through a resistor 67 to a terminal 68 at one end of a secondary coil 69 in the pulse transformer 47. The secondary coil 69 is polarized as indicated by the dot 70. The terminal 68 also is joined through a resistor 71 to a terminal 72 connected to a source of negative voltage; for example, minus 12 volts. From the connection of the capacitor 64 and the lead 66 another conductor 73 goes to the base of a transistor 74, the collector 76 of which is joined to a terminal 77 at the other end of the pulse transformer secondary coil 69. There is a lead 78 extending to the voltage comparator output terminal 79. The emitter 81 of the transistor is connected through a resistor 82 to a terminal 83 joined to common. Shunting the resistor 82 is a capacitor 84 connected by one lead 86 to the common terminal 83 and by another lead 87 to the other terminal of the resistor 82. A resistor 88 at one end is joined by a lead 89 to the common terminal 83 and at the other end is connected through a diode 91 to a terminal 92 at the conductor 73.

The operation of the voltage comparator elements in the circuitry of FIGURE 4 is to impose the values of the voltage existing in the lead 26 on the pulse transformer 47 through the primary coil 49 and also to impose upon the pulse transformer the voltage existing in the conductor 46 through the primary coil 52. When the voltage in the lead 26 is less than the voltage in the conductor 46, there is not output from the comparator 27, but when the voltage in the lead 26 exceeds the voltage in the conductor 46, both voltages as compared to common, then a pulse is emitted by the secondary 69 of the transformer and appears through the lead 78 at the output terminal 79.

The pulse from the output terminal 79 of the voltage comparator 27, furnished when the voltage in the lead 26 exceeds the voltage in the conductor 46, appears in a conductor 94 (FIGURE 1) and passes through a then open inhibit gate 96 and continues through a conductor 97 into a voltage comparator memory 98. This memory unit 98 includes a standard flip-flop circuit shiftable between a set position and a reset position. When the memory unit 98 is in its reset position, then there is a connection to —V. The impulse entering the memory unit 98 through the conductor 97 is effective to shift the flip-flop to set position. In the set position, the unit 98 is connected to common.

Leaving the voltage comparator memory 98 in its set and common-connected condition momentarily, attention is directed to a pulse generator 101. This is a relatively standard unit effective to emit pulses in a regularly timed train or succession and to this extent is a "clock." The pulse generator 101 is adjustable by means of a variable frequency network diagrammatically illustrated and including a capacitor 102 and a resistor 103 interconnected by leads 104 and 106. A connection 107 to the lead 106 is joined by a conductor 108 to the remaining circuitry of the pulse generator 101. The lead 104 is connected to —V by a lead 109. By using appropriate values in this network, the frequency of emission of pulses from the generator 101 is appropriately controlled.

Pulses from the generator 101 are conducted by a lead 111 to a junction point 112, there being a lead 113 extending to a test point 114. From the junction point 112 a lead 116 extends to an inhibit gate 117, the output from which travels by means of a conductor 118 to an enable gate 119. The output of the enable gate 119 travels through a conductor 121 to a multivibrator 122 which is a standard flip-flop unit acting as a pulse driver and varying between a set condition as regulated by the pulses entering through the conductor 121 and a reset condition.

Pulses travel through a conductor 123 extending between the lead 116 and an enable gate 124. The output lead 126 of the gate 124 is joined to the multivibrator 122 to control the reset condition thereof. When the multivibrator 122 is in set condition, the output is connected to common, but when the multivibrator 122 is in reset condition, the output is connected to —V.

As the pulses from the pulse generator 101 travel through the junction point 112 and through the lead 116, they encounter the inhibit gate 117. If such gate is in inhibit condition, the pulse cannot pass, but rather proceeds through the conductor 123 and through the enable gate 124, which is in enable condition, and so puts the multivibrator 122 in reset condition.

When the multivibrator 122 is in its reset condition, there are two outputs therefrom. One of the outputs is through a conductor 127 having one terminal of a resistor 128 connected thereto at a point 129. The other terminal 130 of the resistor 128 is at minus voltage. The control conductor 127 itself continues to the input of a pulse former 131. When energized pursuant to a pulse in the conductor 127, the pulse former furnishes pulses each constituted of a standard quantity of electricity for affecting the voltage at the standard point 31. Stated differently, the pulse former 131 when energized correspondingly emits a standard quantity of electricity to charge the capacitor 32.

The pulse former, as particularly illustrated in FIGURE 3, has a terminal 132 to which the control conductor 127 is joined and also has a terminal 133 at negative voltage and a terminal 134 serving as a common connection. From the terminal 132 a lead 136 extends to a tuned circuit including a capacitor 137 joined to an adjustable inductor 138. From the inductor a conductor 139 having a resistor 141 therein extends to the emitter 142 of a transistor 143. The base of the transistor is joined by a lead 144 to a conductor 146 connected to the common terminal 134. A conductor 147 extends from the lead 144 to the core of the adjustable inductor 138. A diode 148 is connected between the conductors 139 and 147 to pass only negative peaks to the transistor 143, while a resistor 149 parallels the diode and is similarly connected to the conductors 139 and 147 to complete the tuned circuit furnishing standard width pulses.

The collector 151 of the transistor 143 operating as an amplifier has a lead 154 extending to a temperature compensating network enclosed within the dotted lines 156. This network includes a pair of diodes 157 and 158 in series with a Zener diode 159 joined by a conductor 160 to an extension 161 joined to the conductor 146 through a resistor 162. A diode 163 joins the conductor 160 to a minus voltage conductor 164 fastened to the terminal 133. A resistor 165 bridges the lead 154 and the conductor 164.

Included with the temperature compensating network is an amplifying transistor 166 acting as a constant current pulse regulator and having its base joined by a lead 167 to a variable connection 168 to a resistor 169. One end of the resistor 169 is connected to the lead 154, whereas the other end of the resistor 169 is joined by a lead 171 between the diodes 158 and 159. By adjusting the variable connection 168 relative to the resistor 169, the proper amount of temperature compensation for the transistor 166 can be obtained.

The collector 172 of the transistor 166 is joined by a conductor 173 through a diode 174 and a conductor 176 leading to the standard point 31 (FIGURE 1). Shunting the diode 174 is a resistor 178 at one end connected to a terminal 179 and at the other end connected to a plus voltage terminal 181. The precision resistor 36 and the capacitor 32 are effectively connected to the standard point 31, as shown in FIGURE 1. From the emitter 182 of the transistor 166 a conductor 183 leads through a resistor 184 and through a variable resistor 186 to a terminal 187, there being a lead 188 from the terminal having a contact 189 adjustably positioned on the resistor 186 to standardize the magnitude of the constant current pulse. From the terminal 187 a conductor 191 extends to a terminal 192. This is joined by a strap 193 to a terminal 194 of the extension conductor 161.

The result of each energization of the circuitry of FIGURE 3 by a pulse from the multivibrator 122 is to provide a standard pulse containing a precise quantity of electricity (a coulomb quantity) effective through the conductor 176 and the lead 33 to place a unit charge on the capacitor 32. The pulse former 131 repeatedly gives the capacitor 32 measured charges of electricity and in this stepwise fashion the voltage of the capacitor is repeatedly augmented and thus is built up by set increments to virtually any desired value. During this time, the charge on the capacitor 32 flows away and the voltage reduces at a standard or set rate as controlled by the precision resistor 36. Thus, the rate at which the separate increments of electric charge arrive at the capacitor 32 with respect to the steady rate of discharge of the capacitor through the precision resistor 36 controls the instantaneous voltage appearing at the standard point 31.

The value of the voltage at the point 31 can be built up by one pulse or by successive pulses to exceed the momentary value of the voltage at the voltage comparator 27 as represented by the voltage in the lead 26 therein. As the voltage in the lead 26 reflecting that at the data source 1 increases, then an addition or additions of electricity to the capacitor 32 build the voltage thereof up to and eventually past the momentary voltage at the meter 1. As the voltage at the meter 1 falls to a lower value, charges of electricity are withheld from the capacitor 32, thus permitting the capacitor voltage to drop at a steady, precise rate through the precision resistor 36 until the voltage in the conductor 46 in the voltage comparator is less than that in the lead 26 representing the meter voltage.

By controlling the arrival of pulses of standard quantities of electricity at the capacitor 32, the actual voltage indicated by the meter 1 can be approximated. At any given instant the voltage in the conductor 46 is thus either slightly below or slightly above the actual voltage at the meter lead 26. The discrepancy or difference between the two voltages can be made as small as is practically desired. For all useful purposes the instantaneous voltage at the standard point 31 and that existing instantaneously at the meter are accurately compared. Whenever the meter voltage exceeds in the predetermined small amount the voltage of the standard point 31, a pulse emanates from the voltage comparator 27 but not otherwise. This pulse travels through the conductor 94 and the then enabled inhibit gate 96 into a voltage comparator memory 98. This puts that memory unit in set condition, thereupon changing the output from the voltage comparator memory 98 from −V to common and by removing the control signal from the gate 96 preventing any further pulses in the conductor 94 from reaching the memory unit 98.

From the pulse generator 101 a succession of pulses travels to the junction point 112. One of these pulses goes through the conductor 116 and the enabled gate 117 and the then enabled gate 119 and the conductor 121 to put the multivibrator 122 in its set condition. In this set condition, not only does the output level act through the conductor 127 to cause the pulse former 131 to emit a pulse and thus add a standard increment of charge to the capacitor 32, but also the set output level of the multivibrator 122 acts through a conductor 201 leading to a coupling gate 202. The output line 203 thereof furnishes a pulse to the voltage comparator memory 98 to put the voltage comparator memory into its reset condition. The enable gate 202 has its control conductor 204 extending to a common terminal 206.

When the voltage comparator memory 98 is in its reset condition, then energy emanates therefrom in a conductor 207 having a branch 208 extending to the control of the enable gate 119 to block the enable gate 119. Thus, the gate 119 is blocked whenever the memory 98 is in its reset condition. The conductor 207 is also provided with a branch 209 going to a terminal 211 from which a lead 212 extends to the control of the inhibit gate 96. When the memory 98 is in its reset condition, energy flows to the inhibit gate 96 and places it in enabling condition. The conductor 94 is in effect joined to the conductor 97 whenever the memory 98 is in reset condition. The output of the voltage comparator can then put the voltage comparator memory in set condition to enable the gate 119 and to inhibit the gate 96.

Between the terminal 211 and a terminal 213 in the conductor 46 between the standard point 31 and the voltage comparator 27 is a diode 214 having a resistor 216 in series therewith. The signal from the voltage comparator memory over the branch 209 which is effective to enable the gate 96 is also effective through the resistor 216 and the diode 214 to put the resistor 216 in shunt with the precision resistor 36 after the voltage comparison is made, whereas when there is a common connection in the branch 209, then the similar resistor 62 (FIGURE 4) of the memory unit 98 is in shunt with the precision resistor.

The conductor 201 leading from the pulse driver 122 not only goes to the enable gate 202, but also has a connection 217 with a lead 218 extending to the control of the enable gate 124 and goes to a terminal 219 having a lead 221 extending to the control of the inhibit gate 117. Thus when the multivibrator 122 is in its set condition, not only is the pulse former 131 actuated, but also the enable gate 124 is put in enable condition, whereas the inhibit gate 117 is put in its inhibit condition. The result of this circuitry is to control the multivibrator 122 in response to the operation of the pulse generator 101. One pulse from that generator puts the multivibrator 122 in its set condition to produce an output from the pulse former 131. The next pulse from the generator 101 puts the multivibrator 122 back into its reset condition.

The operation of the multivibrator 122 is also under the control of the output of the voltage comparator memory 98 by means of the enable gate 119. When the memory unit 98 is in its set position, the enable gate 119 is enabled and the effect of the pulses from the pulse generator is as described. But when the memory 98 is in its reset position, then its output affects the control of the gate 119 to block pulse flow therethrough and the operation of the multivibrator 122 is stopped. Thus when the voltage of the meter 1 is lower than that at the standard point 31 and when the voltage comparator 27 thus has no output, the voltage control memory 98 is in reset position, the gate 119 permits no pulses to get to the multivibrator 122, and while the pulse generator 101 continues to operate, the pulse former 131 is shut off.

As soon as the voltage at the meter 1 exceeds that at the standard point 31, the voltage comparator 27 puts out a pulse to set the voltage comparator memory 98, whereupon the output of the memory 98 puts the enable gate 119 in enable condition. A succeeding pulse from the generator 101 then operates to put the multivibrator 122 in its set condition, the pulse former 131 is again actuated and the condition of the gates 124 and 117 is reversed. Thus, when the multivibrator 122 is operating, it emits one or more pulses and operates at one-half the frequency of the generator 101.

Particularly pursuant to the invention, there is provided means for transmitting to the receiver a signal in the nature of one pulse for each time the pulse former 131 is actuated. From the terminal 219 a conductor 224 extends to a pulse modulator 226 which is a flip-flop arrangement. The conductor 224 extends to a terminal 227 having a branch 228 passing through an enable gate 229 joined by a lead 231 to the reset control 232 of the modulator 226. From the terminal 227 another branch 233 passes to an inhibit gate 234 connected through a conductor 236 to an enable gate 237, the output going to the set control 238 of the modulator 226. There are two outputs from the modulator 226. One travels through a conductor 239 to a terminal 241 from which a lead 242 extends to the control of the inhibit gate 234. The terminal 241 also has a lead 243 extending to the control of the enable gate 229. The control of the enable gate 237 is by means of a lead 244 going to common. This gate acts upon a proper change in condition in the conductor 236 to send a set pulse into the modulator 226.

An incoming pulse on the conductor 224, if the enable gate 229 is open, passes through the branch 228 and the lead 231 to the reset control 232 and conditions the modulator 226 to its reset state. In this state the conductor 239 energizes the inhibit gate 234, thus opening it for a subsequent operation and also blocks the enable gate 229. A subsequent pulse is blocked by the closed gate 229 and travels through the now open inhibit gate 234 and to the always open enable gate 237. The resulting pulse goes to the set control 238, putting the flip-flop modulator 226 in its off condition. Thus the modulator 226 takes one condition for one pulse and the other condition for the next succeeding pulse arriving over the conductor 224.

When the modulator 226 is in its reset condition, not only is there output through the conductor 239, but likewise there is output through a conductor 251 containing a resistor 252 and leading to a terminal 253. At this terminal there is a test point 254. Connected to the conductor 251 there is a resistor 256 having a terminal 257 connected to the source of minus voltage Also there may be provided a capacitor 258 connected to a common terminal 259. The capacitor 258 is to restrict sidebands and is not always utilized. From the terminal 253 a conductor 260 extends to a phase shift carrier transmitter 261 of the kind more particularly described and shown in my above-identified, copending application. The function of the transmitter 261 is to respond to one pulse received through the conductor 260 from the modulator 226 and to send out for carrier transmission a corresponding signal at an arbitrary phase and then to transmit in response to a succeeding pulse from the modulator 226 a signal having a predetermined phase relationship to the immediately preceding signal.

The transmitter 261 includes an oscillator carrier generator incorporating a variable inductance 263 at one end having a conductor 264 extending to a terminal 266 connected to negative voltage and at the other end having a lead 267 going to the collector 268 of a transistor 269. In parallel with the inductor 263 is a capacitor 271 at one end connected to the lead 267 and another capacitor 272 at one end connected to the conductor 264. A tap 273 between the capacitors is joined to a lead 274 extending to a terminal 276. A resistor 277 connects the terminal 276 with the emitter 278 of the transistor 269. The base of the transistor is joined by a conductor 279 and through a diode 281 to a common terminal 282. A resistor 283 is joined to the conductor 279 and to a negative voltage terminal 284. To the terminal 276 a resistor 286 is joined. From one side of the resistor 286 a resistor 287 leads to a junction 288 connected to a common terminal 289. The other side of the resistor 286 is joined through a resistor 291 to the junction 288 and so to the common terminal 289.

From the terminal 292 of the resistor 286 a conductor 293 extends to the primary coil 294 of a transformer 296. The coil 294 is joined to a common terminal 297 through a lead 298. The core 299 of the transformer 296 is in inductive relationship with the primary coil 294 and with a secondary coil 300. The conductor 260 from the modulator 226 is joined to a center tap 301 in the secondary coil of the transformer 296.

In circuit with the secondary coil 300 is a primary coil 302 of another transformer 303 having a core 304. In a conductor 306 joining one end of the secondary coil 300 to the corresponding end of the primary coil 302 is a diode 307. Similarly, in a conductor 308 joining the other end of the secondary coil 300 to the corresponding end of the primary coil 302 is a diode 309. Cross connecting the conductors 306 and 308 on opposite sides of their respective diodes 307 and 309 are leads 311 and 312 each containing one of two diodes 313 and 314. A center tap 316 in the coil 302 is connected by a lead 317 to a point 318 from which a resistor 319 extends to a negative voltage terminal 321. From the point 318 another resistor 322 goes to a common terminal 333.

With this arrangement, particularly as described in the above-identified copending application, the output of the carrier generator is transferred through the transformer 296 to the transformer 303. Between the transfomers the phase of the curent transmitted is changed each time the conductor 260 is pulsed. There is no particular standard phase. Each succeeding pulse shifts the phase of the outgoing current a predetermined amount with respect to the actual phase of the preceding output. In the present instance, successive one hundred eighty degree phase shifts are used to indicate two alternate conditions.

The arbitrarily designated first pulse to the modulator 226 energizes the conductor 260 and establishes at the center tap 301 a voltage, for example, higher than that at the center tap 316. This causes the coils 300 and 302 to have one particular phase relationship. The next succeeding pulse to the modulator 226 interrupts the output therefrom and drops the voltage at the center tap 301 to a value lower than that at the center tap 316. This changes the relationship of the primary coils 300 and 302 one hundred eightly degrees from the immediately pre-existing relationship.

Each pulse which goes into the modulator 226 either sets or resets that modulator. The modulator 226 when reset, for example, raises the voltage at the center tap 301 to establish one phase relationship in the primary coil 302. The next pulse to the modulator 226 sets it for no output. The voltage at the secondary coil center tap 301 drops and the phase relationship in the primary coil 302 shifts one hundred eighty degrees from its preceding condition.

The field of the coil 302 of the transformer 303 is effective upon a secondary coil 334. One end of this coil is connected to a common terminal 336 by a lead 337 having a diode 338 therein. The other end of the secondary coil 334 is connected by a conductor 339 through a resistor 341 to a junction 342. A conductor 343 joins the lead 337 and the junction 342. From the junction 342 a resistor 344 extends to a negative voltage terminal 346. From the resistor 341 a variable point 347 connects a lead 348 to an adjustor 349 for varying the level of transmission. The output from the adjusting device 349 is by means of a conductor 351 to the base of a transistor 352. The emitter 353 of the transistor is joined through a resistor 354 to a common terminal 356. The collector 357 of the transistor 352 is joined by a conductor 358 to a terminal 359 in an output carrier filter 361. Another terminal 362 in the filter is joined by a lead 363 to a negative voltage terminal 364. Between the terminals 359 and 362 is disposed the primary coil 366 of a filter transformer 367 in shunt with a resistor 368, these elements being joined by conductors 369 and 371. The secondary coil 372 of the filter transformer 367 at one end is joined by a lead 373 to a terminal 374. The other end of the filter transformer secondary coil 372 is joined through a capacitor 378 and an inductor 379 to a line 381 leading to a terminal 382. The signal is transmitted from the terminals 374 and 382 by customary means. The core 384 of the inductor 379 and the core 386 of the transformer 367 are joined by a lead 387 and by a wire 388 to a common connection 389.

With this mechanism, pulses are imposed on the carrier transmitted to the line at the terminals 374 and 382. Each pulse differs from the immediately preceding pulse by a phase shift of one hundred eighty degrees. Each pulse is transmitted when and only when the voltage of the meter 1 or data source is greater than the instantaneous voltage at the reference or standard point 31. The number of successive pulses (one or more) transmitted during a short interval is directly dependent upon the amount that the voltage from the source of data at that time exceeds the voltage then at the point 31.

Figure 2:
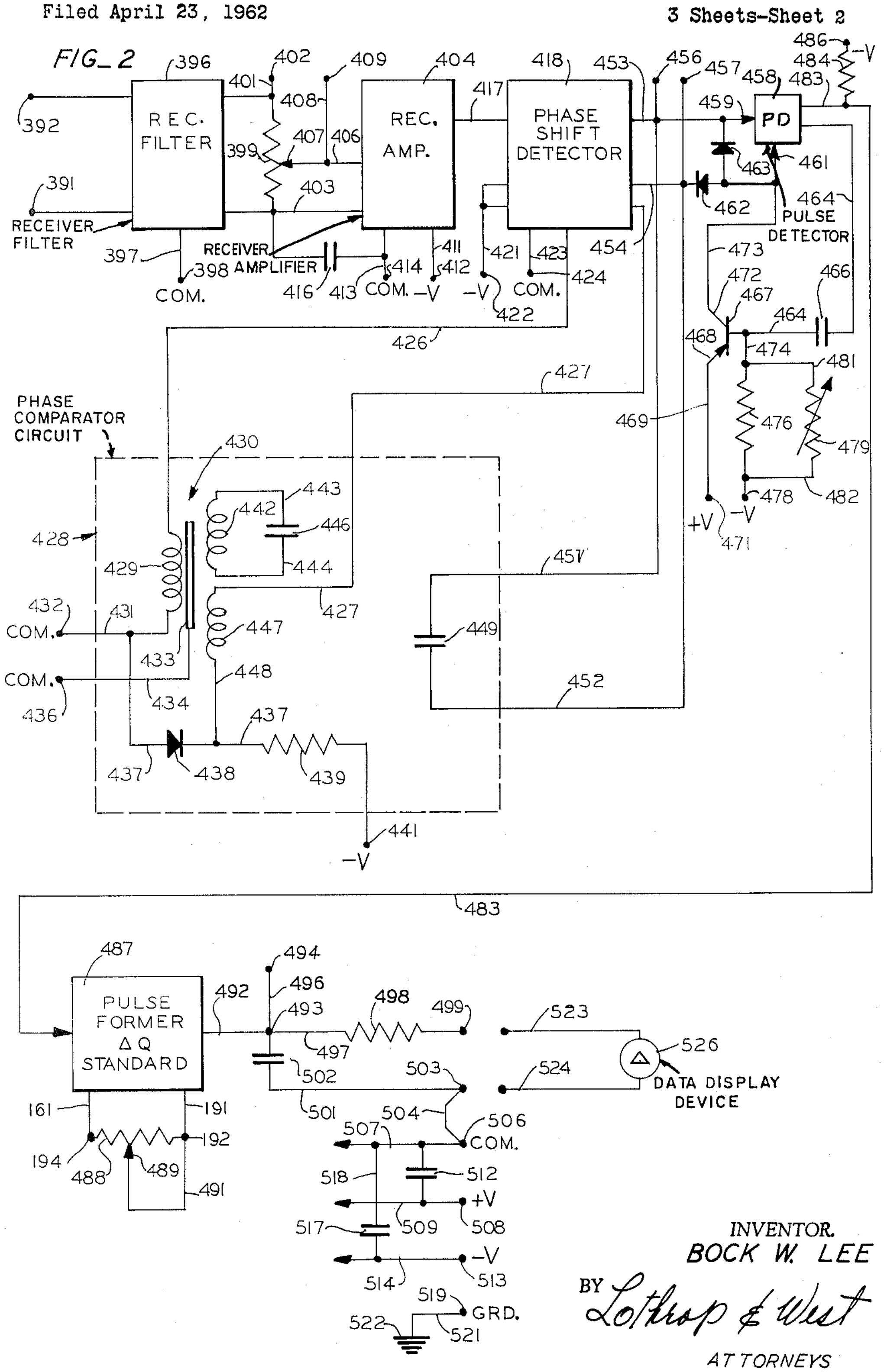
FIGURE 2 is a schematic diagram showing the receiving unit and data display device.

At the receiving end of the transmission represented (FIGURE 2) by the conductors 391 and 392, there is a receiving filter 396. This is substantially a standard unit and is connected by a lead 397 to a common terminal 398. Across the output of the receiving filter is a resistor 399 one end of which has a lead 401 going to a test point 402 and the other end of which is connected by a line 403 to a receiving amplifier 404. Also connected to the amplifier 404 is a lead 406 joined to a variable point 407 on the resistor 399. A lead 408 goes from the lead 406 to a test point 409. By appropriately adjusting the position of the variable point 407, the amount of gain in the receiving amplifier 404 can be altered.

The receiving amplifier is connected by a lead 411 to a negative voltage terminal 412 and is connected by a lead 413 to a common terminal 414. A capacitor 416 also connects the end of the resistor 399 to common. From the receiving amplifier 404 a line 417 extends to a phase shift detector 418. This detector is substantially the same as that disclosed in my above-identified copending application and is responsive to the change or shift in phase of successive pulses received from the conductors 391 and 392. The detector 418 has lines extending through a conductor 421 to a negative voltage terminal 422 and also has a lead 423 extending to a common terminal 424.

Connected into the phase shift detector by conductors 426 and 427 is a comparator unit 428. The conductor 426 extends to a primary coil 429 included in a transformer 430, the coil having a lead 431 extending to a common terminal 432. The core 433 of the transformer is also connected by a lead 434 to a common terminal 436. The lead 431 is also joined by a conductor 437 through a diode 438 and a resistor 439 to a negative voltage terminal 441. The transformer 430 has a secondary coil 442, the ends of which are joined by leads 443 and 444 to a capacitor 446, thus providing a local oscillator circuit. The transformer 430 also has a secondary coil 447, one end of which is joined by a lead 448 to the conductor 437 between the diode 438 and the resistor 439. The other end of the coil 447 is joined to the conductor 427. Included in the unit 428 is a capacitor 449 connected by leads 451 and 452 to output lines 453 and 454 extending from the phases shift detector 418. For the lines 453 and 454 test points 456 and 457 are provided.

The lines 453 and 454 extend to a pulse detector 458 which includes a standard flip-flop, the line 453 ending in a control 459 for the set condition of the pulse detector flip-flop, and the line 454 having a control 461 for the reset position of the pulse detector flip-flop. A diode 462 is in the line 454 in advance of the pulse detector, whereas a diode 463 shunts the lines 453 and 454 just in advance of the pulse detector. When the pulse detector 458 is in its set position as controlled by the control 459, then there is a connection to common from the output, but when the pulse detector is in its reset position then there are two outputs therefrom. One of these outputs is through a conductor 464 extending through a capacitor 466 to the base of a transistor 467.

The emitter 468 of the transistor is joined by a lead 469 to a positive voltage terminal 471. The collector 472 of the transistor is joined by a conductor 473 to the line 454 and so is effective in connection with the reset of the pulse detector 458. Connected between the conductor 464 intermediate the capacitor 466 and the base of the transistor 467 is a lead 474 connected through a resistor 476 to a negative terminal voltage 478. Shunting the resistor 476 is a variable resistor 479 connected to the lead 474 by a lead 481 and by a lead 482.

In assembling this unit, the capacitor 466 and the resistor 479 are chosen in value and are so set that the time during which the receiver pulse detector 458 is on or is in reset condition is equal to the period of time during which the transmitter pulse generator 101 is on. That is to say, the local timer or "clock" 101 in the transmitter is matched by the time period in the receiver as controlled by the local circuit connected by the conductor 464 and the lead 474 joined to the base of the transistor 467. The reset control 461 of the pulse detector 458 is thus synchronized with the timing of the impulses from the transmitter.

When the pulse detector 458 is in its reset position and a signal is supplied to the conductor 464, then another signal is simultaneously supplied to a conductor 483 from which a resistor 484 extends to a negative voltage terminal 486. The conductor 483 connects to a pulse former 487 substantially identical in construction to the pulse former 131 illustrated in detail in FIGURE 3, an exception being that the conductor 191 to the terminal 192 and the extension 161 to the terminal 194 are not joined by a strap 193 as shown in FIGURE 3. Rather, in this instance the terminals 192 and 194 are joined by a resistor 488 having a variable contact point 489 joined by a lead 491 to the terminal 192. The movable point 489 acts as a calibrating adjustment for the pulse former 487.

The output of the pulse former is conducted through a lead 492 to a junction point 493 to which a test point 494 is connected by a lead 496. From the point 493 a conductor 497 extends through a resistor 498 to a terminal 499. Also from the junction point 493 a conductor 501 containing a capacitor 502 ends in a terminal 503. A jumper 504 connects the terminal 503 to a common terminal 506 connected by a lead 507 to other common terminals. A positive voltage terminal 508 is provided with a conductor 509 which goes to other positive voltage terminals. A capacitor 512 is connected to the lead 507 and the conductor 509. A negative voltage terminal 513 is joined by a lead 514 to other negative voltage terminals. A capacitor 517 is connected across the lines 507 and 514 by a conductor 518. For convenience, a ground terminal 519 is joined by a lead 521 to the chassis ground 522.

To the terminal 499 and to the terminal 503 are connected conductors 523 and 524 extending to an indicator 526. The indicator is preferably a suitable device calibrated in a fashion comparable to the range of the initiating variable meter 1, FIGURE 1. If the calibrations of the meter 1 and the indicator 526 are identical, the displays at the sending point and the receiving point are the same within narrow limits. It is not necessary that the calibrations be identical as any understood representation of the initial data can be employed.

Sometimes the initiating meter has insufficient power to operate the transmitting unit as described herein. While an especially sensitive transmitter can be provided, it is usually preferred to use a regular transmitter and to amplify the initial signal to an appropriate value to be easily handled. For this purpose a magnetic amplifier, as shown in FIGURE 5, can be supplied.

In this case the weak data source is joined to the input terminals 531 and 532 leading to the amplifier. The amplifier output terminals 533 and 534 are joined to the lines 4 and 5 of the transmitter (FIGURE 1). The amplifier is a standard unit. From the terminal 532 a conductor 536 extends to a primary coil 537 polarized as indicated by the dot 538. To the other terminal 531 a filter coil 539 is joined at one end and a filter capacitor 541 joins the other end of the coil 539 and the conductor 536. A resistor 542 and a thermistor 543 are also in series between the filter coil 539 and the primary coil 537. A temperature compensating resistor 544 shunts the resistor 542 and the thermistor.

Also disposed within the casing 546 of the amplifier is another coil 547 polarized as shown by the dot 548 and connected by conductors 549 and 551 to the terminal point 9 and the terminal 43, as shown in FIGURE 1, the strap 38 then being omitted. The power supply to the amplifier, nominally at 115 volts and 60 cycles, is by means of leads 552 and 553 from any convenient source, not shown. The signal from the amplifier appears across conductors 554 and 556, the former containing a resistor 557 and going to the output terminal 533 while the latter is directly joined to the terminal 534 which extends to the terminal point 9 and so to the common terminal 11 (FIGURE 1). A capacitor 558 bridges the conductors 554 and 556 while the casing 546 of the amplifier is also connected to common by a lead 559 joined to the conductor 556.

In the operation of this structure, the direct or amplified indications from the data source 1, being transmitted as shifts in phase by the transmitter (FIGURE 1) and being received and detected in the receiver (FIGURE 2), result in corresponding pulses put out by the phase shift detector 418 and detected by the pulse detector 458. This, turn, is effective to actuate the pulse former 487 in precise accordance therewith. The output from the pulse former, being an identical reproduction of the output of the structure shown in FIGURE 3, is a succession of definite quantities of electricity, each being effective to impress a definite increment of charge on the capacitor 502 corresponding to the capacitor 32 in FIGURE 1. As the charge on the capacitor 502 builds up, the voltage at the standard point 492 correspondingly increases. Further, the charge on the capacitor 502 leaks away through the standard calibrated resistor 498 which corresponds exactly to the resistor 36 in FIGURE 1. This reduces the voltage at the standard point 493. Thus there are recreated in the receiver by devices near the end of the conductor 483 precisely the same instantaneous conditions which exist in the transmitter substantially at the same time and as controlled by the meter 1.

Each time a pulse is formed by the pulse former 487 the voltage across the capacitor 502 is increased and between pulses the voltage across the capacitor declines. Thus the voltage existing across the indicator meter 526 continually increases and declines. In this fashion when the pulses are interrupted because the voltage at the initiating data source 1 is declining in value, correspondingly the indicating meter 526 declines. When the indicating meter 1 at the source increases in voltage value, then one or more pulses are transmitted by the phase shift carrier. At the receiver pulses in an equivalent number affect the pulse former to put a corresponding number of charges on the capacitor 502, thus in small increments or steps raising the indication of the meter 526 to match that of the source meter 1. For substantially steady state conditions, the quantity of electricity impressed upon the capacitor 502 for each increment and the rate of leakage hold the meter 526 without noticeable practical variation. In this fashion data are transmitted by a pulse technique over a phase shift carrier system to produce their analogs at the receiver in accordance with the objects of the invention.

What is claimed is:

1. An analog data system comprising a transmitting unit including a source of variable voltage representing data to be transmitted, a first capacitor, means effective at intervals for charging said first capacitor with a predetermined quantity of electricity, means for conducting current from said first capacitor at a predetermined rate, means for comparing the voltage at said source of data with the voltage across said first capacitor, means for transmitting a pulse from said transmitting unit whenever and only whenever the voltage of said source of data exceeds the voltage across said first capacitor, means for receiving said pulses, a second capacitor, means for conducting current from said second capacitor at said predetermined rate, means responsive to each of the pulses received by said receiving means for charging said second capacitor with a predetermined quantity of electricity, and means for indicating the voltage across said second capacitor.

2. An analog data system comprising a transmitting unit including a source of variable voltage representing data to be transmitted, a first capacitor, means periodically effective to charge said first capacitor, means for comparing the voltage at said source with the voltage across said first capacitor, means for reducing the voltage across said first capacitor at a predetermined rate, means controlled by said voltage comparing means for charging said first capacitor when and only when the voltage of said source exceeds the voltage across said first capacitor, means for transmitting a pulse whenever said charging means is effective, means for receiving said pulses, a second capacitor, means responsive to a received pulse for charging said second capacitor in an amount comparable to the charge of said first capacitor, means for reducing the voltage of said second capacitor at said predetermined rate, and means for indicating the voltage across said second capacitor.

3. An analog data system comprising a transmitting unit and a receiving unit responsive to said transmitting unit, said transmitting unit and said receiving unit each including a respective one of two capacitors, means respectively at said transmitting unit and said receiving unit for periodically charging said two capacitors in substantially equal increments, means respectively at said transmitting unit and said receiving unit for substantially equally reducing the voltage across said two capacitors, a source of variable voltage representing data, means at said transmitting unit for charging said transmitter capacitor with a sufficient number of increments of charge each of predetermined quantity to bring the voltage across said transmitter capacitor up to the voltage of said source, means for transmitting a pulse from said transmitter to said receiver for each one of said increments of charge, means at said receiver unit and responsive to said pulse for charging said receiver capacitor with an increment of charge of predetermined quantity, and means for indicating the voltage across said receiver capacitor.

4. In an analog data system, a source of continually variable voltage, a capacitor, means for forming individual predetermined increments of charge, means for charging said capacitor with a number of said increments of charge and thereby increasing the voltage across said capacitor in steps one for each of said increments, means for discharging said capacitor at a predetermined rate thereby decreasing the voltage across said capacitor, means for comparing the instantaneous voltage of said source with the instantaneous voltage across said capacitor, means for transmitting a pulse for each of said increments of charge conducted to said capacitor, and means under the control of said comparing means for charging said capacitor with said increments of charge whenever and only whenever the voltage across said capacitor is less than the voltage at said source.

5. An analog data system comprising a source of variable voltage, a capacitor, means for charging said capacitor with predetermined increments of charge to increase the voltage across said capacitor, a resistor, means for connecting said resistor to discharge said capacitor to decrease the voltage across said capacitor, a voltage comparator responsive to the voltage of said source and responsive to the voltage across said capacitor, a multivibrator, a local pulse generator for actuating said multivibrator, means controlled by said multivibrator for actuating said capacitor charging means, means controlled by said multivibrator for transmitting a pulse, and means controlled by said voltage comparator for operating said multivibrator whenever and only whenever the voltage across said capacitor is less than the voltage of said source.

6. An analog data system comprising a source of variable voltage, a capacitor, means energized by a pulse for charging said capacitor with a predetermined increment of charge whereby the voltage across said capacitor is increased, means including a resistor for discharging said capacitor whereby the voltage across said capacitor is decreased substantially at a predetermined rate, a local pulse generator operating at a predetermined rate, a pulse transmitter, a multivibrator responsive to said local pulse generator for energizing said charging means and for energizing said pulse transmitter, means for comparing the voltage of said source and the voltage of said capacitor, and means effective when and only when said voltage across said capacitor is less than said source voltage for operating said multivibrator.

References Cited by the Examiner

UNITED STATES PATENTS

| | | | |
|---|---|---|---|
| 2,336,929 | 12/1943 | Doyle | 340—206 |
| 2,689,952 | 9/1954 | Johnson | 340—206 |
| 2,858,438 | 10/1958 | Merrill | 340—206 |
| 2,883,650 | 4/1959 | Brockway | 340—206 |
| 3,068,458 | 12/1962 | Hansson | 340—206 |

FOREIGN PATENTS

| | | |
|---|---|---|
| 381,376 | 10/1932 | Great Britain. |

NEIL C. READ, *Primary Examiner.*

THOMAS B. HABECKER, *Examiner.*